(12) United States Patent
Sasanuma

(10) Patent No.: US 11,434,962 B2
(45) Date of Patent: Sep. 6, 2022

(54) CLUTCH UNIT

(71) Applicant: NTN Corporation, Osaka (JP)

(72) Inventor: Kyohei Sasanuma, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 17/288,994

(22) PCT Filed: Oct. 25, 2019

(86) PCT No.: PCT/JP2019/041877
§ 371 (c)(1),
(2) Date: Apr. 27, 2021

(87) PCT Pub. No.: WO2020/090647
PCT Pub. Date: May 7, 2020

(65) Prior Publication Data
US 2021/0404520 A1 Dec. 30, 2021

(30) Foreign Application Priority Data

Oct. 31, 2018 (JP) .............................. JP2018-205177

(51) Int. Cl.
*F16D 41/08* (2006.01)
*B60N 2/16* (2006.01)
*F16D 41/10* (2006.01)

(52) U.S. Cl.
CPC ............ *F16D 41/088* (2013.01); *B60N 2/167* (2013.01); *B60N 2/1615* (2013.01); *F16D 41/105* (2013.01)

(58) Field of Classification Search
CPC ..... B60N 2/167; B60N 2/1615; F16D 41/088; F16D 41/105; F16D 41/08
See application file for complete search history.

(56) References Cited

U.S. PATENT DOCUMENTS

2009/0273218 A1* 11/2009 Park ...................... B60N 2/167
297/284.6
2015/0075935 A1 3/2015 Kitayama et al.

FOREIGN PATENT DOCUMENTS

JP 2004-92718 3/2004
JP 2010-19343 1/2010
(Continued)

OTHER PUBLICATIONS

International Preliminary Report on Patentability dated Apr. 27, 2021 in International (PCT) Patent Application No. PCT/JP2019/041877.

(Continued)

*Primary Examiner* — Ernesto A Suarez
*Assistant Examiner* — Lori Wu
(74) *Attorney, Agent, or Firm* — Wenderoth, Lind & Ponack, L.L.P.

(57) ABSTRACT

A clutch unit includes a lever-side clutch section configured to control transmission and interruption of rotational torque input by a rotation of an operation lever, and a brake-side clutch section configured to transmit the rotational torque from the lever-side clutch section to an output side and interrupt rotational torque that is reversely input from the output side. The lever-side clutch section includes a side plate to which the operation lever is fixed and an outer ring member that fits with the side plate. The brake-side clutch section includes a cover whose rotation is restricted. An angle regulating part configured to regulate a rotation angle of the operation lever is disposed radially inside of outer peripheral edges of the outer ring member and the cover and includes a claw of the outer ring member and a through hole of the cover.

4 Claims, 10 Drawing Sheets

(56) References Cited

FOREIGN PATENT DOCUMENTS

| | | |
|---|---|---|
| JP | 2010-255837 | 11/2010 |
| JP | 2011-169402 | 9/2011 |
| JP | 2013-199993 | 10/2013 |
| WO | 2012/039253 | 3/2012 |

OTHER PUBLICATIONS

International Search Report dated Jan. 21, 2020 in International (PCT) Application No. PCT/JP2019/041877.
Extended European Search Report dated Jun. 23, 2022 in corresponding European Patent Application No. 19879179.0.

* cited by examiner

CLUTCH UNIT

TECHNICAL FIELD

The present invention relates to a clutch unit including an input-side clutch section to which rotational torque is input and an output-side clutch section that transmits the rotational torque from the input-side clutch section to an output side and interrupts a rotational torque from the output side.

BACKGROUND ART

In a clutch unit using an engaging element such as a cylindrical roller, a clutch section is disposed between an input member and an output member. The clutch section is configured to control transmission and interruption of rotational torque by engaging and disengaging the engaging element between the input member and the output member.

The applicant has previously proposed a clutch unit incorporated in an automobile seat lifter that adjusts a seat up and down by lever operation (rotation of an operation lever) (see, for example, Patent Literature 1).

As shown in FIG. 8, the clutch unit disclosed in Patent Literature 1 includes a lever-side clutch section 111 to which rotational torque is input by lever operation and a brake-side clutch section 112 that transmits the rotational torque from the lever-side clutch section 111 to an output side and interrupts rotational torque from the output side.

The lever-side clutch section 111 includes an outer ring 114 to which rotational torque is input by lever operation. Further, the brake-side clutch section 112 includes an outer ring 123, a cover 124, and a side plate 125 as a stationary member whose rotation is restricted.

A claw 125a of the side plate 125 is fitted and crimped to cutout recesses 123b and 124a of the outer ring 123 and the cover 124. As a result, the side plate 125, the outer ring 123, and the cover 124 are integrated.

In the clutch unit in Patent Literature 1, an angle regulating part 132 that regulates a rotation angle of the operation lever is provided on an outer periphery of the outer ring 114 and the cover 124 as shown in FIGS. 9 and 10. The angle regulating part 132 includes a claw 114c provided on the outer periphery of the outer ring 114 and a cutout recess 124b provided on the outer periphery of the cover 124.

In response to a rotation of the outer ring 114 by the lever operation, the claw 114c of the outer ring 114 moves in a circumferential direction in the cutout recess 124b of the cover 124. At a moving end, the claw 114c contacts a circumferential end surface 124c of the cutout recess 124b.

In this way, when the outer ring 114 is rotated by lever operation, the rotation angle of the operation lever is regulated by locking the claw 114c with the circumferential end surface 124c of the cutout recess 124b.

CITATIONS LIST

Patent Literature

Patent Literature 1: JP 2011-169402 A

SUMMARY OF INVENTION

Technical Problems

The claw 114c of the clutch unit disclosed in Patent Literature 1 has a shape in which the outer periphery of the outer ring 114 extends radially outside and is bent in an axial direction. Due to this shape, the claw 114c is disposed in the cutout recess 124b located on the outer periphery of the cover 124.

With the angle regulating part 132 having such a structure, the claw 114c needs to extend radially outside to the outer periphery of the cover 124. Therefore, there is a problem that the claw 114c becomes large and a weight of the outer ring 114 increases.

Further, a crimping part (the claw 125a fitted in the cutout recess 124a) for integrating the side plate 125 and the outer ring 123 is disposed on the outer periphery of the cover 124. Therefore, the cutout recess 124b needs to be provided on the outer periphery of the cover 124 so as to avoid this crimping part.

The arrangement of the cutout recess 124b is restricted by the presence of the crimping part, and thus there is also a problem that flexibility in layout of the angle regulating part 132 is low and an allowable rotation angle of the operation lever is limited.

The present invention has been proposed in view of the above problems, and an object of the present invention is to provide a clutch unit capable of reducing a weight of an outer ring and improving flexibility in layout of an angle regulating part.

Solutions to Problems

A clutch unit of the present invention is provided with a basic configuration including an input-side clutch section configured to control transmission and interruption of rotational torque that is input by a rotation of an operation lever and an output-side clutch section configured to transmit the rotational torque from the input-side clutch section to an output side and interrupt rotational torque that is reversely input from the output side.

The input-side clutch section of the present invention includes a side plate to which the operation lever is fixed and an outer ring member that fits to the side plate, and the output-side clutch section of the present invention includes a stationary member whose rotation is restricted.

As a technical means for achieving the above object, in the present invention, an angle regulating part that regulates a rotation angle of the operation lever is disposed radially inside of outer peripheral edges of the outer ring member and the stationary member.

In the present invention, the angle regulating part is disposed radially inside of the outer peripheral edges of the outer ring member and the stationary member. Thus, a claw of the outer ring member does not have to extend radially outside to the outer periphery of the stationary member as in the known art, and a weight of the outer ring member can be easily reduced. Further, it is not necessary to avoid a crimping part on an outer periphery of the stationary member, and therefore flexibility in layout of the angle regulating part can be improved.

The angle regulating part may include a claw provided on the outer ring member and a locked part provided on the stationary member, accommodating the claw so as to be movable in a circumferential direction, and locking the claw at a moving end of the claw.

With this structure, a configuration can be easily achieved in which the claw of the outer ring member to which the rotational torque is input by the lever operation is moved within the locked part of the stationary member and locked at the moving end of the claw, and then the rotation angle of the operation lever is restricted.

The input-side clutch section and the output-side clutch section in the present invention are desirably incorporated in an automobile seat lifter.

With this structure, the weight of the seat lifter can be reduced by using the input-side clutch section as a lever-side clutch section and the output-side clutch section as a brake-side clutch section, and flexibility in layout of the operation lever in the seat lifter can be improved.

Advantageous Effects of Invention

In the present invention, the angle regulating part is disposed radially inside of the outer peripheral edges of the outer ring member and the stationary member. Thus, the claw of the outer ring member does not have to extend radially outside to the outer periphery of the stationary member as in the known art, and the weight of the outer ring member can be easily reduced. Further, it is not necessary to avoid a crimping part on an outer periphery of the stationary member, and therefore flexibility in layout of the angle regulating part can be improved.

DESCRIPTION OF EMBODIMENT

An embodiment of a clutch unit according to the present invention will be described in detail with reference to the drawings. In the following embodiment, the clutch unit incorporated in an automobile seat lifter is illustrated, but the clutch unit can be applied to other than the automobile seat lifter.

Figure 1:
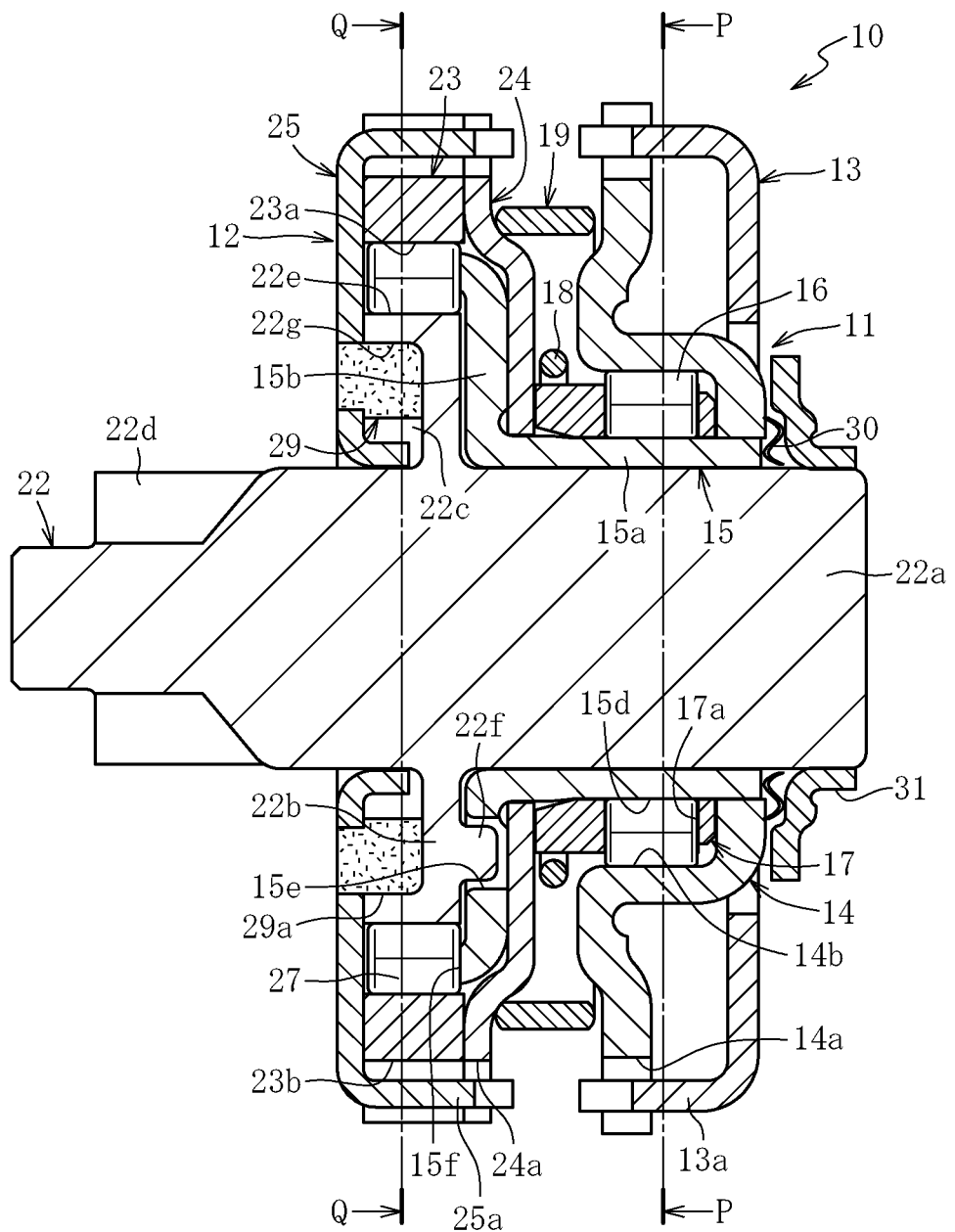
FIG. 1 is a cross-sectional view of an overall configuration of a clutch unit according to an embodiment of the present invention.
Figure 2:
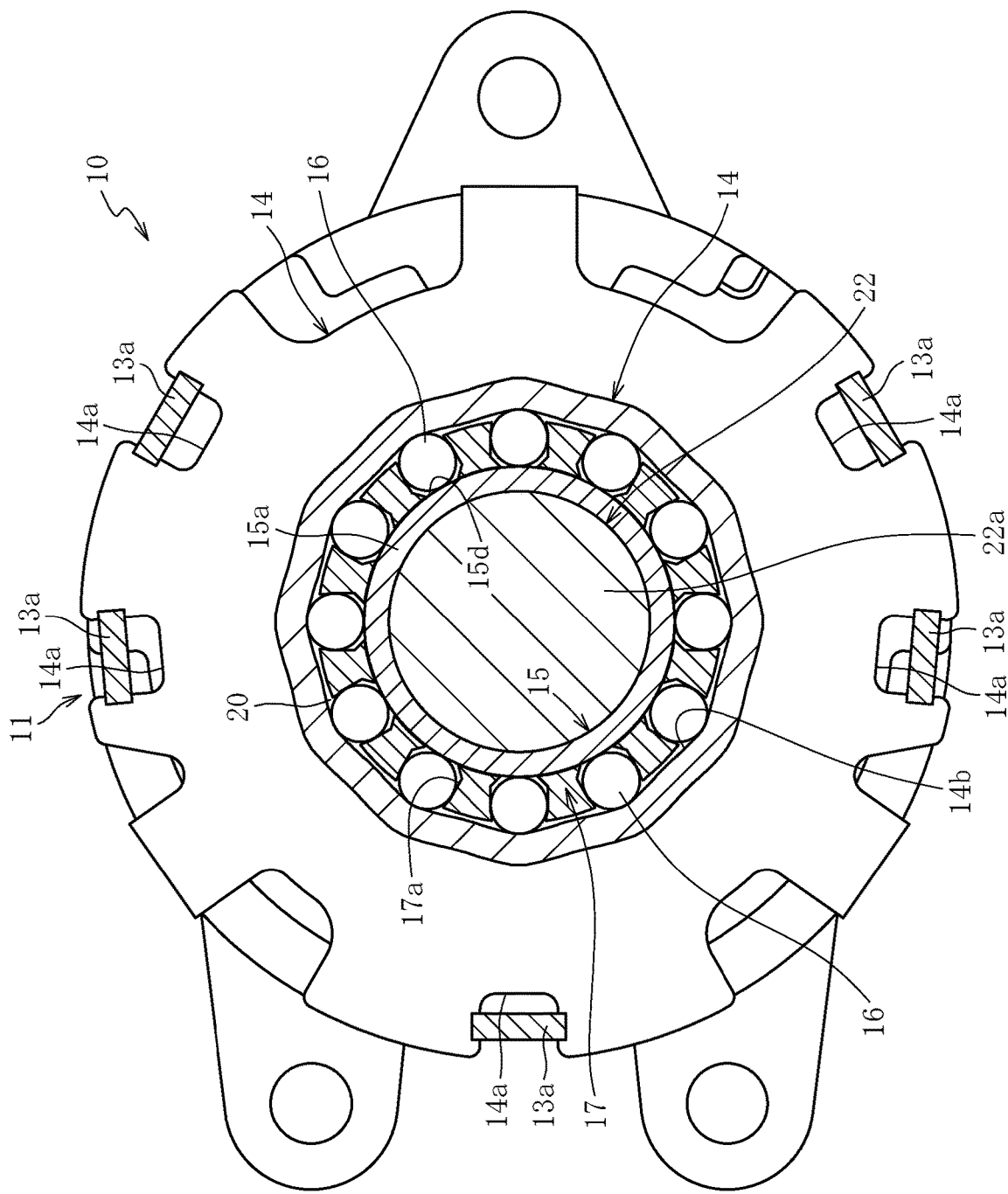
FIG. 2 is a cross-sectional view taken along line P-P in FIG. 1.
Figure 3:
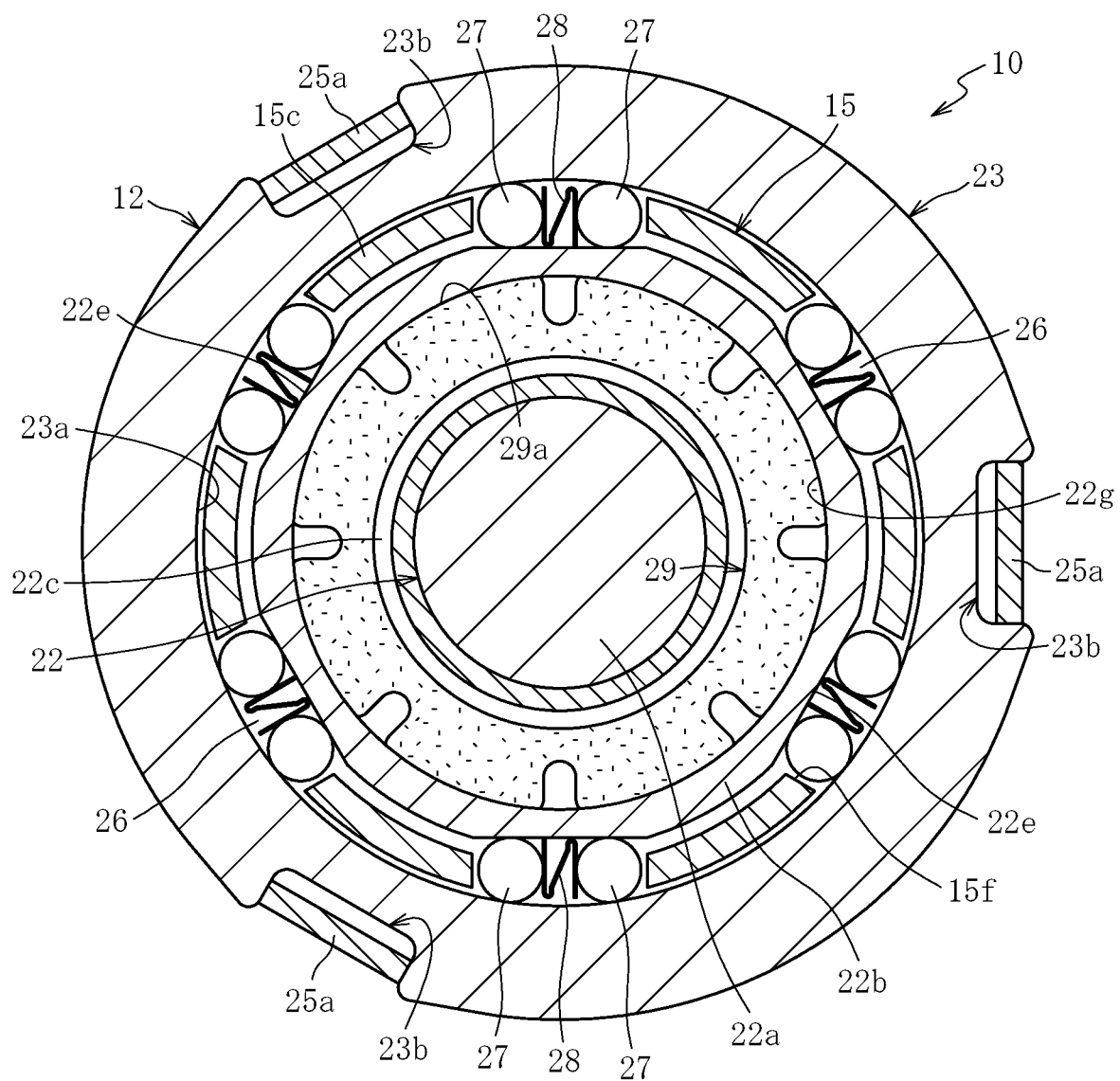
FIG. 3 is a cross-sectional view taken along line Q-Q in FIG. 1.

FIG. 1 is a cross-sectional view of an overall configuration of the clutch unit, FIG. 2 is a cross-sectional view taken along line P-P in FIG. 1, and FIG. 3 is a cross-sectional view taken along line Q-Q in FIG. 1. Before explanation of a characteristic configuration of this embodiment, the overall configuration of the clutch unit will be described.

As shown in FIG. 1, a clutch unit 10 according to this embodiment has a structure in which a lever-side clutch section 11 as an input-side clutch section and a brake-side clutch section 12 as an output-side clutch section are unitized.

The lever-side clutch section 11 controls transmission and interruption of rotational torque input by lever operation (rotation of an operation lever). The brake-side clutch section 12 has a reverse input interruption function that transmits the rotational torque from the lever-side clutch section 11 to an output side and interrupts rotational torque that is reversely input from the output side.

As shown in FIGS. 1 and 2, a main part of the lever-side clutch section 11 includes a side plate 13, an outer ring member 14, an inner ring 15, a plurality of cylindrical rollers 16, a cage 17, an inner centering spring 18, and an outer centering spring 19.

The side plate 13 has a claw 13a extending in an axial direction (toward the brake-side clutch section 12) from an outer peripheral edge of the side plate 13. The claw 13a is fitted and crimped to a cutout recess 14a formed in an outer peripheral edge of the outer ring member 14. As a result, the side plate 13 and the outer ring member 14 are integrated. The rotational torque is input to the side plate 13 and the outer ring member 14 by an operation lever 43 (see FIG. 4) attached to the side plate 13.

The inner ring 15 has a cylindrical part 15a into which an output shaft 22 is inserted, an enlarged diameter part 15b in which a brake-side end of the cylindrical part 15a extends radially outside, and a plurality of pillars 15c (see FIG. 3) that extends in the axial direction with an outer peripheral end of the enlarged diameter part 15b bent in the axial direction. The inner ring 15 transmits the rotational torque input from the outer ring member 14 to the brake-side clutch section 12.

A plurality of cam surfaces 14b is formed on an inner periphery of the outer ring member 14 at equal intervals in a circumferential direction. A wedge clearance 20 is formed between the cam surface 14b and a cylindrical outer peripheral surface 15d of the cylindrical part 15a of the inner ring 15.

The cylindrical rollers 16 are disposed between the outer ring member 14 and the inner ring 15. The cylindrical rollers 16 control transmission and interruption of the rotational torque from the outer ring member 14 by engaging and disengaging at the wedge clearance 20 formed between the cam surface 14b of the outer ring member 14 and the outer peripheral surface 15d of the inner ring 15.

In the cage 17, pockets 17a holding the cylindrical rollers 16 with the wedge clearance 20 are formed at a plurality of locations in the circumferential direction at equal intervals.

The inner centering spring 18 is a C-shaped elastic member having a circular cross section disposed between the cage 17 and the cover 24 of the brake-side clutch section 12, and both ends of the inner centering spring 18 are locked to a part of the cage 17 and the cover 24.

In response to the input of the rotational torque from the outer ring member 14 by lever operation, the inner centering spring 18 expands in diameter as the cage 17 rotates following the outer ring member 14 with respect to the cover 24 in a stationary state. As a result, an elastic force is accumulated in the inner centering spring 18. When the input of the rotational torque from the outer ring member 14 is lost, the cage 17 returns to a neutral state due to the elastic force of the inner centering spring 18.

The outer centering spring 19 located radially outside of the inner centering spring 18 is a C-shaped strip elastic member disposed between the outer ring member 14 and the cover 24 of the brake-side clutch section 12, and both ends of the inner centering spring 18 are locked to a part of the outer ring member 14 and the cover 24.

In response to the input of the rotational torque from the outer ring member 14 by lever operation, the outer centering spring 19 expands in diameter with respect to the cover 24 in a stationary state and has accumulated an elastic force as the outer ring member 14 rotates. When the input of the rotational torque from the outer ring member 14 is lost, the outer ring member 14 returns to a neutral state due to the elastic force of the outer centering spring 19.

As shown in FIGS. 1 and 3, a main part of the brake-side clutch section 12 includes the pillars 15c of the inner ring 15 extending from the lever-side clutch section 11, the output shaft 22, a stationary system which includes an outer ring 23, the cover 24 and a side plate 25, a plurality of pairs of cylindrical rollers 27, a plurality of pairs of leaf springs 28 having an N-shaped cross section, and a friction ring 29.

The output shaft 22 includes a shaft 22a inserted into the cylindrical part 15a of the inner ring 15, a large diameter part 22b extending radially outside from a substantially center of the shaft 22a, and a pinion gear 22d formed coaxially at an output-side end of the shaft 22a. The rotational torque from the lever-side clutch section 11 is output to the output shaft 22.

A plurality of (six in FIG. 3) flat cam surfaces 22e is formed on an outer periphery of the large diameter part 22b at equal intervals in the circumferential direction. A wedge clearance 26 is formed between the cam surfaces 22e of the large diameter part 22b and a cylindrical inner peripheral surface 23a of the outer ring 23.

Two cylindrical rollers 27 and one leaf spring 28 inserted between the cylindrical rollers 27 are disposed in the wedge clearance 26. The cylindrical rollers 27 control interruption of the rotational torque reversely input from the output shaft 22 and transmission of the rotational torque input from the inner ring 15 by engaging and disengaging the cylindrical rollers 27 with respect to the wedge clearance 26. The leaf spring 28 urges the cylindrical rollers 27 to separate from each other in the circumferential direction.

The plurality of pairs (six pairs in FIG. 3) of cylindrical rollers 27 and leaf springs 28 are disposed at equal intervals in the circumferential direction by the pillars 15c of the inner ring 15. The pillars 15c of the inner ring 15 have a function of transmitting the rotational torque input from the outer ring member 14 to the output shaft 22 and a function of accommodating the cylindrical rollers 27 and the leaf springs 28 in pockets 15f and holding the cylindrical rollers 27 and the leaf springs 28 at equal intervals in the circumferential direction.

Further, the large diameter part 22b is provided with a protrusion 22f for transmitting the rotational torque from the inner ring 15 to the output shaft 22. The protrusion 22f is inserted into a hole 15e formed in the enlarged diameter part 15b of the inner ring 15 with a clearance in the circumferential direction.

Figure 4:
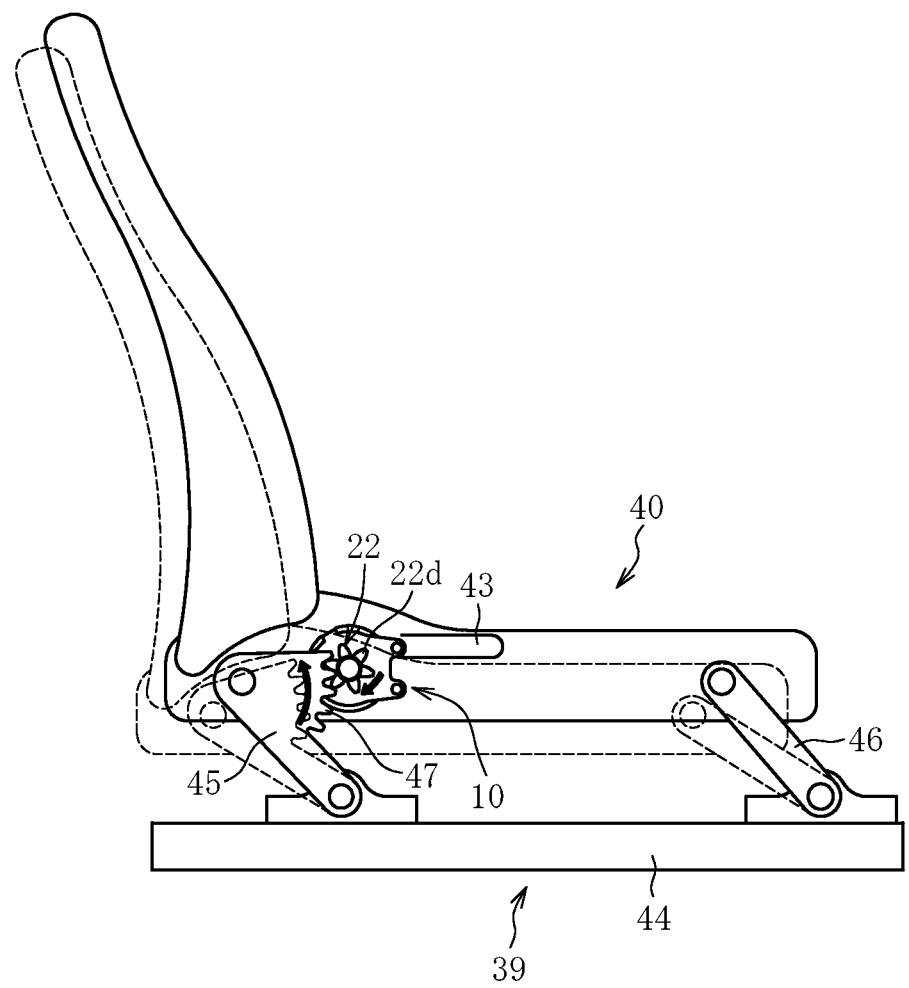
FIG. 4 is a configuration diagram of a seat and a seat lifter of an automobile.

The pinion gear 22d is connected to a seat lifter 39 (see FIG. 4). A washer 31 that is press-fitted into an input-side end of the shaft 22a via a wave washer 30 prevents components of the lever-side clutch section 11 from coming off.

Cutout recesses 23b and 24a are formed at outer peripheral edges of the outer ring 23 and the cover 24, and a claw 25a is formed at an outer peripheral edge of the side plate 25. The claw 25a is fitted and crimped into the cutout recesses 23b and 24a to integrate the outer ring 23, the cover 24, and the side plate 25.

The friction ring 29 is, for example, a resin member, and is fixed to the side plate 25. The friction ring 29 is press-fitted into an inner peripheral surface 22g of an annular recess 22c formed in the large diameter part 22b of the output shaft 22 with a fitting allowance.

When lever operation is performed, a frictional force generated between the outer peripheral surface 29a of the friction ring 29 and the inner peripheral surface 22g of the annular recess 22c imparts rotational resistance to the output shaft 22 that slides against the friction ring 29 fixed to the side plate 25 in a stationary state.

An example of operations of the lever-side clutch section 11 and the brake-side clutch section 12 having the above structure will be described below.

In the lever-side clutch section 11, in response to the input of the rotational torque to the outer ring member 14 by lever operation, the cylindrical rollers 16 engage with the wedge clearance 20 between the outer ring member 14 and the inner ring 15. Due to the engagement of the cylindrical rollers 16 in the wedge clearance 20, the rotational torque is transmitted to the inner ring 15 to rotate the inner ring 15. At this time, an elastic force is accumulated in both centering springs 18 and 19 as the outer ring member 14 and the cage 17 rotate.

When the input of the rotational torque by lever operation is lost, the cage 17 and the outer ring member 14 are returned to a neutral state by the elastic force of the centering springs 18 and 19. On the other hand, the inner ring 15 maintains a given rotation position as it is. Therefore, the inner ring 15 rotates by inching due to the repeated rotation of the outer ring member 14 through pumping operation of the operation lever 43 (see FIG. 4).

In the brake-side clutch section 12, the cylindrical rollers 27 engage with the wedge clearance 26 between the output shaft 22 and the outer ring 23 even when the rotational torque is reversely input to the output shaft 22 due to seating on the seat 40 (see FIG. 4), and the output shaft 22 is then locked to the outer ring 23.

In this way, the rotational torque that is reversely input from the output shaft 22 is locked by the brake-side clutch section 12, and a circulation of the rotational torque that is reversely input to the lever-side clutch section 11 is interrupted. As a result, a seat height of the seat 40 is maintained.

On the other hand, in response to the input of the rotational torque from the lever-side clutch section 11 to the inner ring 15 by lever operation, the pillars 15c of the inner ring 15 contact the cylindrical rollers 27 and press the cylindrical roller 27 against the elastic force of the leaf spring 28.

As a result, the cylindrical rollers 27 are disengaged from the wedge clearance 26. The disengagement of the cylindrical rollers 27 from the wedge clearance 26 causes the locked state of the output shaft 22 to be released and causes the output shaft 22 to be rotatable. At this time, the friction ring 29 imparts rotational resistance to the output shaft 22.

Then, in response to further rotation of the inner ring 15, the clearance between the enlarged diameter part 15b (hole 15e) of the inner ring 15 and the protrusion 22f of the output shaft 22 is closed, and the enlarged diameter part 15b of the inner ring 15 contacts the protrusion 22f of the output shaft 22 in a direction of the rotation.

As a result, the rotational torque from the lever-side clutch section 11 is transmitted to the output shaft 22 via the protrusion 22f, and the output shaft 22 rotates. That is, in response to the inching rotation of the inner ring 15, the output shaft 22 also rotates by inching. As a result, the seat height of the seat 40 can be adjusted.

The clutch unit 10 described above is used by being incorporated in the automobile seat lifter 39 adjusting the seat height of the seat 40 by lever operation. FIG. 4 shows the seat 40 installed in a passenger compartment of an automobile.

As shown in FIG. 4, the seat height of the seat 40 is adjusted by rotating the operation lever 43 attached to the side plate 13 (see FIG. 1) of the lever-side clutch section 11. The seat lifter 39 has a following structure.

One ends of the link members 45 and 46 are pivotally attached to a slidable member 44 so as to be rotatable. The other ends of the link members 45 and 46 are pivotally attached to the seat 40 so as to be rotatable. A sector gear 47 is integrally provided at the other end of the link member 45. The sector gear 47 meshes with the pinion gear 22d of the output shaft 22.

For example, in a case where a seat surface of the seat 40 is to be lowered, the lever is operated in the lever-side clutch section 11, that is, the operation lever 43 of the seat lifter 39 is rotated downward to release a locked state of the brake-side clutch section 12 (see FIG. 1).

When the brake-side clutch section 12 is unlocked, the seat surface of the seat 40 can be smoothly lowered by applying an appropriate rotational resistance to the output shaft 22 by the friction ring 29 (see FIG. 1).

In response to the release of the lock of the brake-side clutch section 12, a rotational torque is transmitted from the lever-side clutch section 11 to the brake-side clutch section 12, and the rotational torque causes the pinion gear 22d of the output shaft 22 of the brake-side clutch section 12 to rotate clockwise (in a direction of an arrow in FIG. 4).

Then, the sector gear 47 meshing with the pinion gear 22d rotates counterclockwise (in the direction of the arrow in FIG. 4), and the link member 45 and the link member 46 both tilt to lower the seat surface of the seat 40.

After the seat height of the seat 40 is adjusted in this way, the operation lever 43 is released, and then the operation lever 43 swings upward due to the elastic force of the centering springs 18 and 19 and returns to an original position (neutral state).

In a case where the operation lever 43 is rotated upward, the seat surface of the seat 40 becomes higher in a reverse operation of the above operation. After the seat height of the seat 40 is adjusted, the operation lever 43 is released, and then the operation lever 43 rotates downward and returns to the original position (neutral state).

The overall configuration of the clutch unit 10 according to this embodiment is as described above. Hereinafter, an angle regulating part 32 that regulates a rotation angle of the operation lever 43 as a characteristic configuration of the clutch unit 10 will be described in detail.

Figure 5:
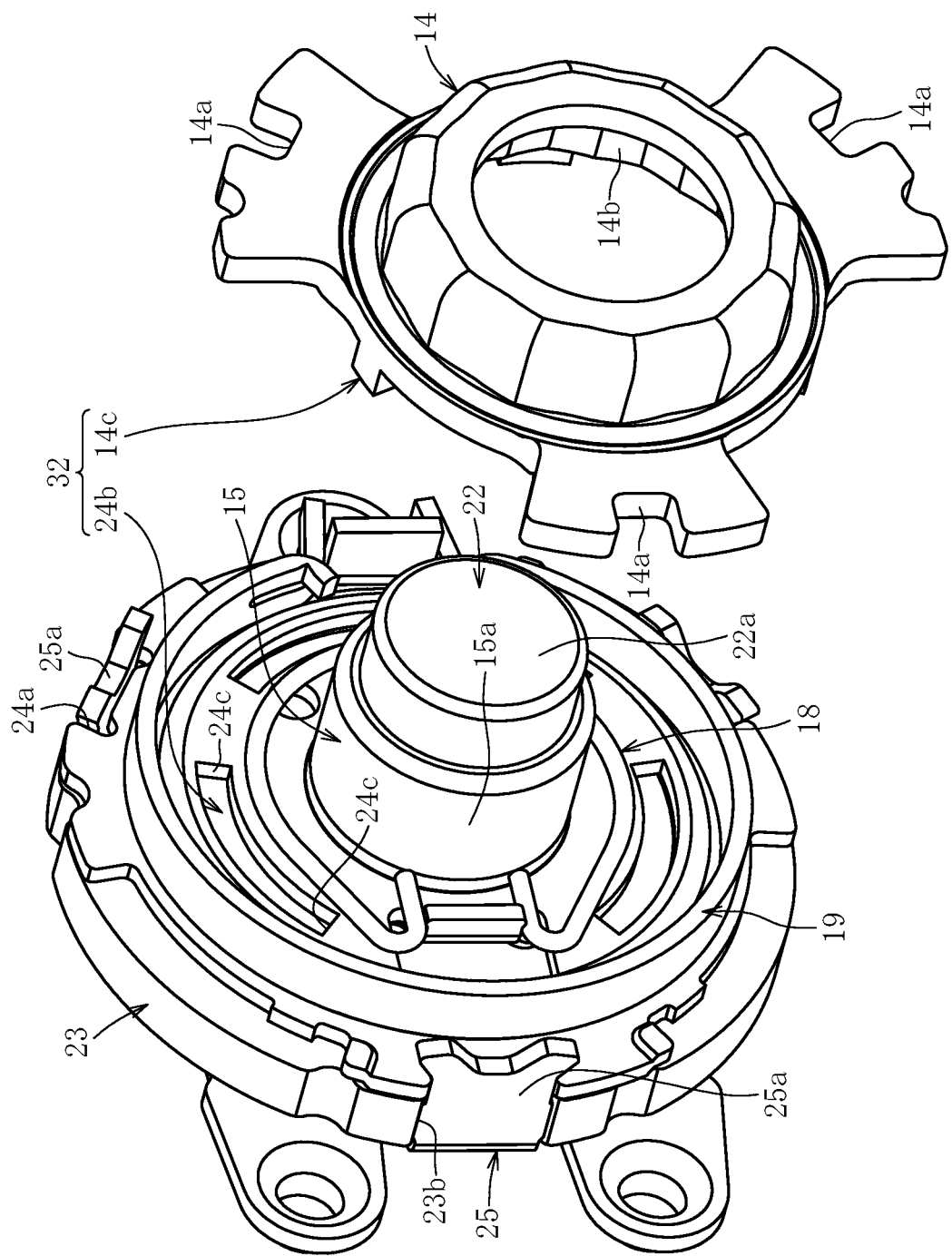
FIG. 5 is a disassembled perspective view of a cover and an outer ring member in FIG. 1.
Figure 6:
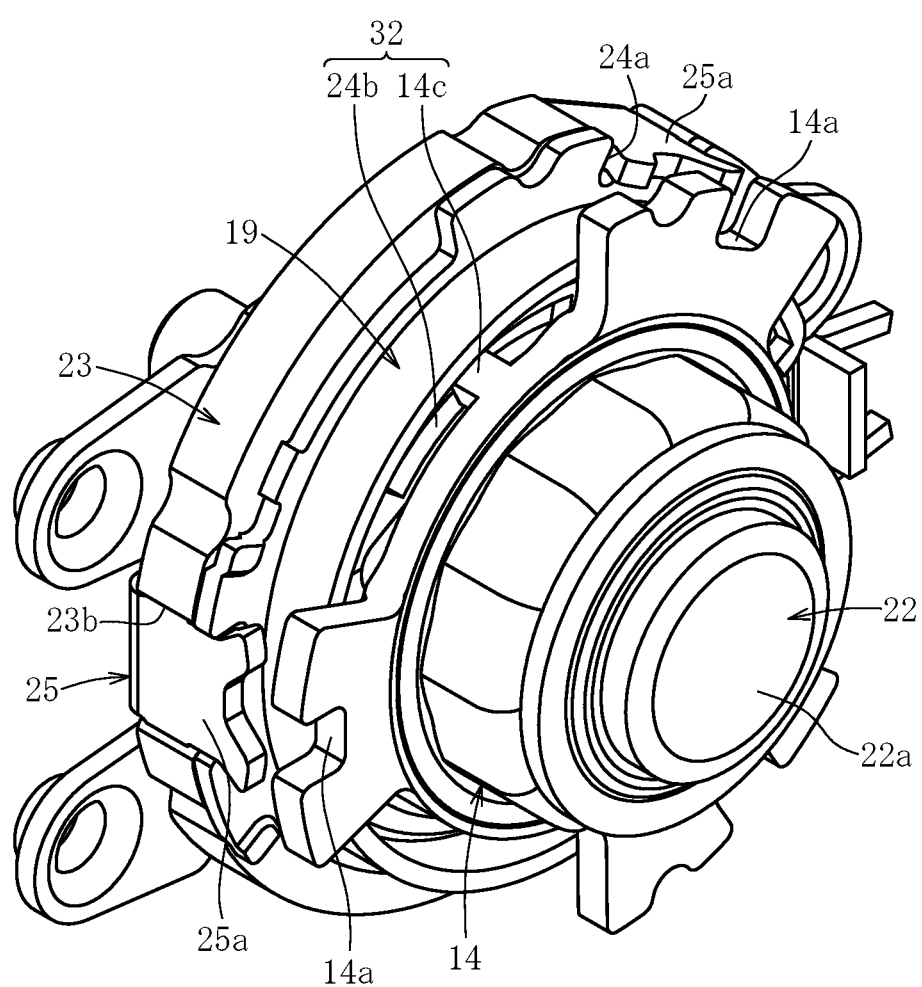
FIG. 6 is a perspective view of completion of assembly in FIG. 5.

As shown in FIGS. 5 and 6, the angle regulating part 32 is disposed radially inside of the outer peripheral edges of the cover 24 of the brake-side clutch section 12 (see FIG. 1) and the outer ring member 14 of the lever-side clutch section 11 (see FIG. 1).

A plurality of (three, in the present embodiment) through holes 24b that penetrates through the cover 24 in a plate thickness direction (axial direction) is formed radially inside of the cover 24, specifically, radially inside of a part of the cover 24 where the outer centering spring 19 is disposed. In the present embodiment, the through holes 24b are arc-shaped slits along the circumferential direction. Each of the through holes 24b has a function as a locked part to which a claw 14c of the outer ring member 14 described later is locked.

Meanwhile, the claw 14c is provided radially inside of the outer ring member 14, specifically, at a part of the outer ring member 14 corresponding to each through hole 24b of the cover 24 in the axial direction. The claw 14c is a protrusion extending from between the adjacent cutout recesses 14a of the outer peripheral edges of the outer ring member 14 toward the cover 24.

The angle regulating part 32 of the operation lever 43 has a configuration in which the claw 14c of the outer ring member 14 is accommodated in the through hole 24b of the cover 24 so as to be movable in the circumferential direction (lever rotation direction) and locked at a moving end of the claw 14c.

Figure 7:
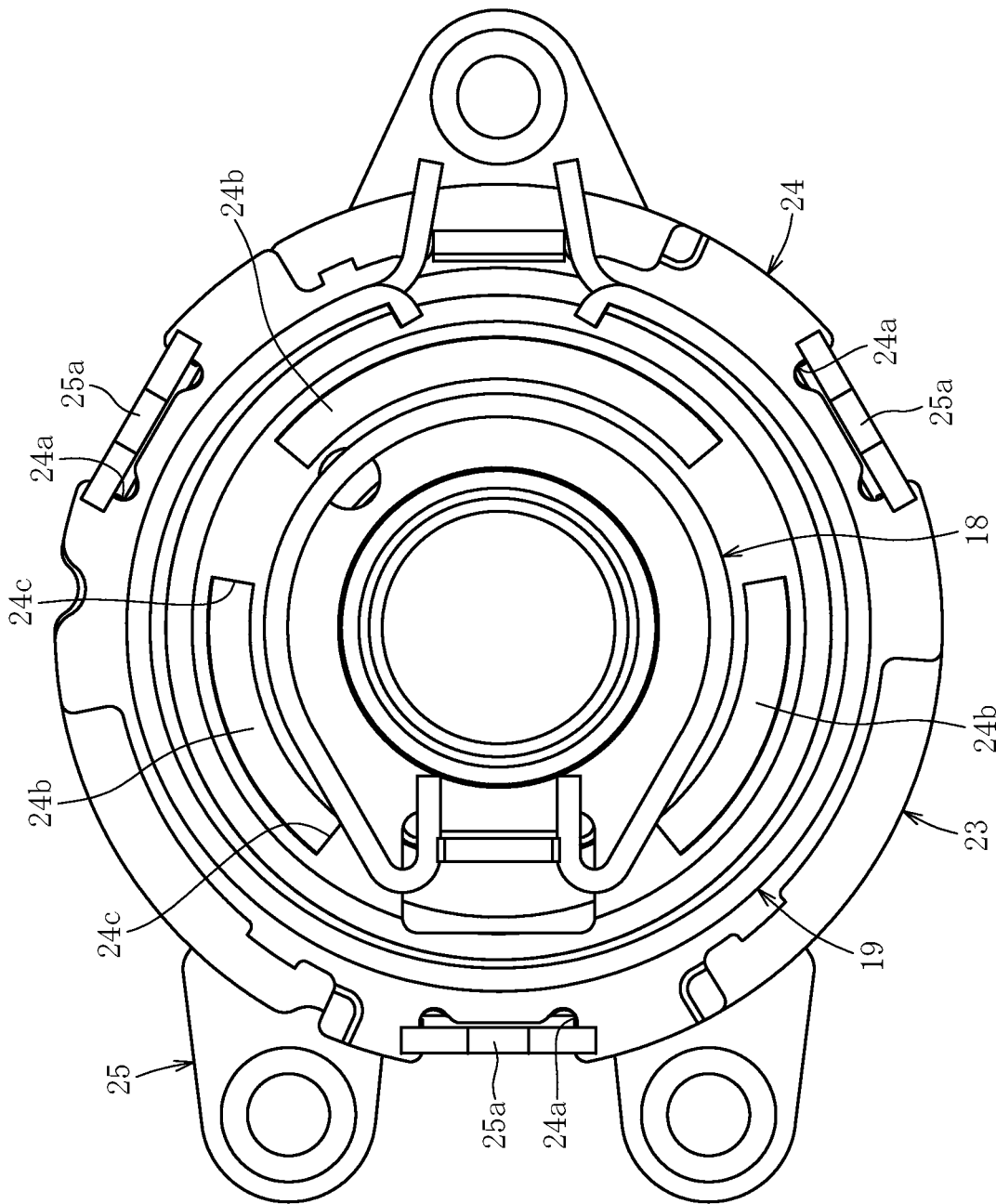
FIG. 7 is a front view of the cover in FIG. 5.
Figure 8:
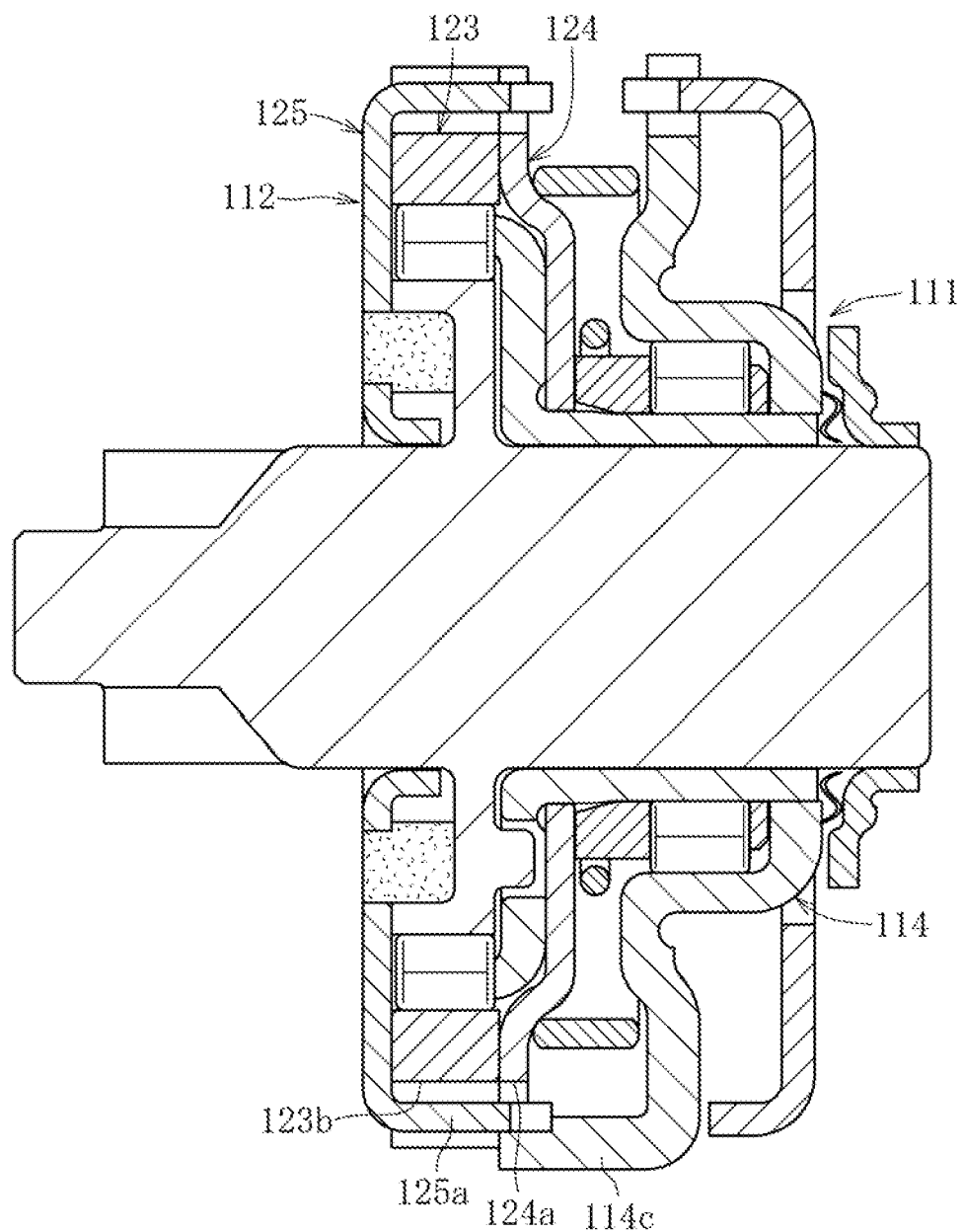
FIG. 8 is a cross-sectional view of an overall configuration of a clutch unit in the known art.
Figure 9:
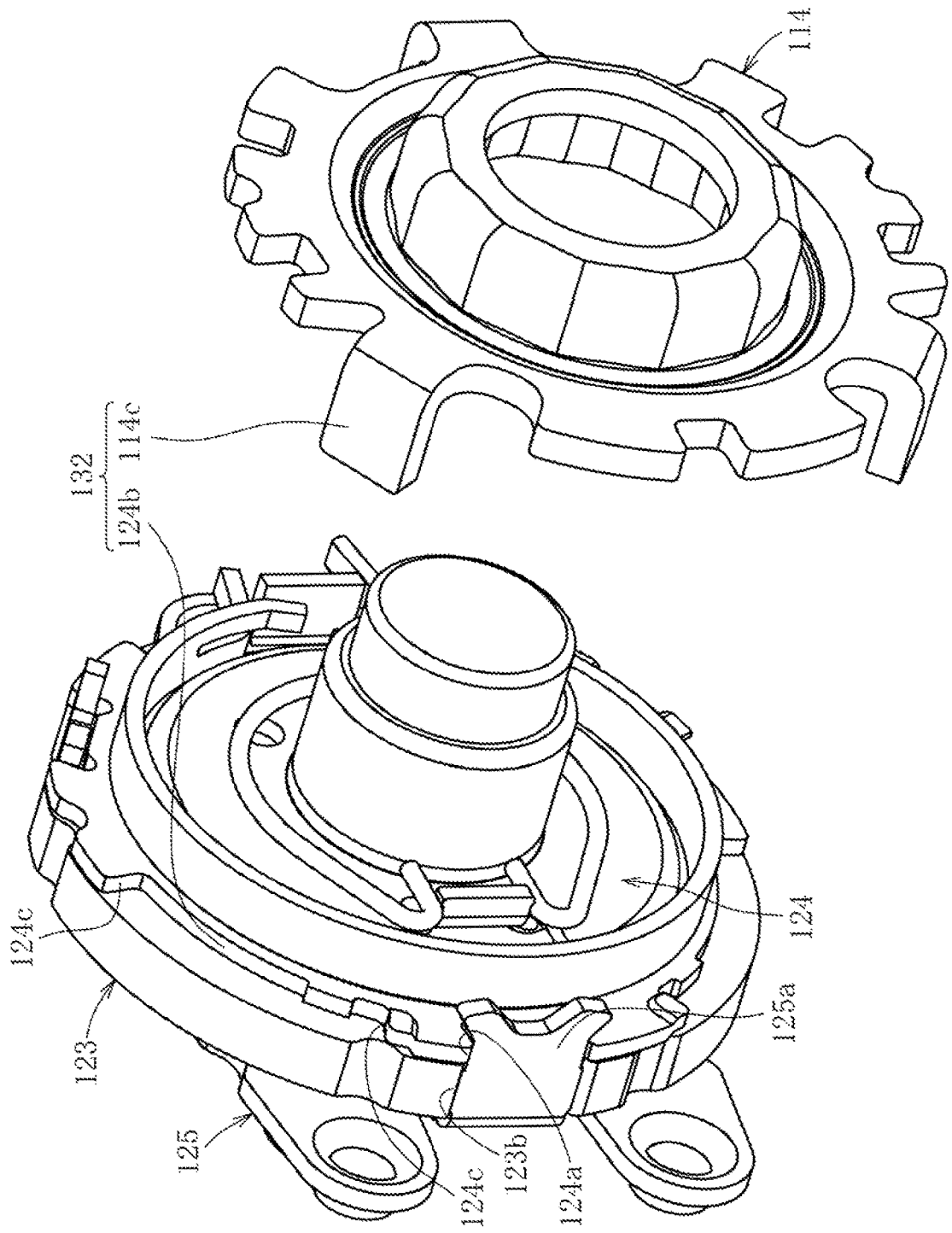
FIG. 9 is a disassembled perspective view of a cover and an outer ring in FIG. 8.
Figure 10:
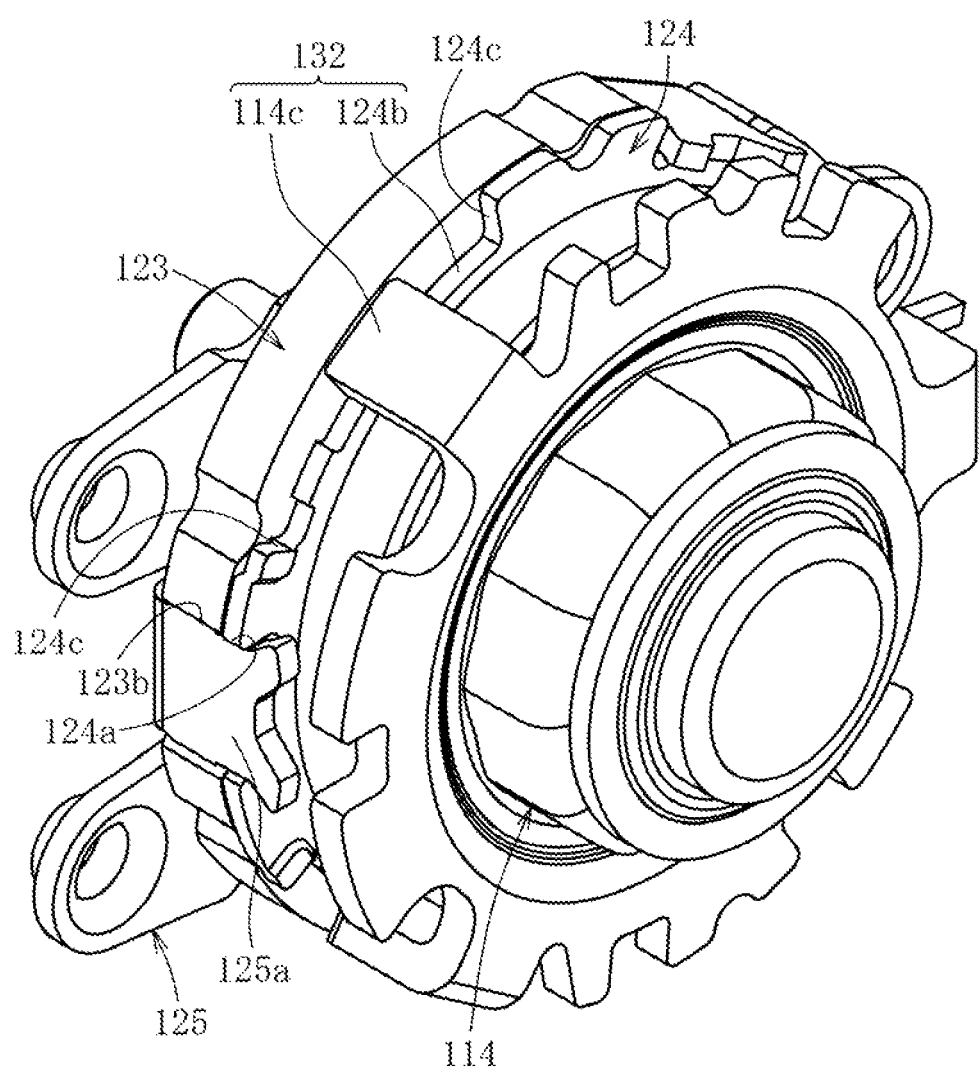
FIG. 10 is a perspective view of completion of assembly in FIG. 9.

The claws 14c and the through holes 24b each configuring the angle regulating part 32 are formed at three locations in the circumferential direction of the outer ring member 14 and the cover 24 at equal intervals (see FIG. 7). The angle regulating parts 32, which are disposed at a plurality of locations (three locations in the drawings) in this way, can disperse stress generated by the rotation of the operation lever 43 and secure strength of the components.

The angle regulating parts 32 are disposed at the plurality of locations in the present embodiment, but the angle regulating part 32 may be disposed at only one location if the strength of the components can be secured.

In the angle regulating part 32 of the operation lever 43, the outer ring member 14 rotates in response to the input of the rotational torque to the outer ring member 14 by the rotation of the operation lever 43, and then, the claw 14c of the outer ring member 14 moves in the circumferential direction (lever rotation direction) in the through hole 24b of the cover 24.

At the moving end, the claw 14c contacts a circumferential end surface 24c of the through hole 24b. The rotation angle of the operation lever 43 is regulated by the claw 14c, which is locked to the circumferential end surface 24c of the through hole 24b in this way.

In the angle regulating part 32 according to the present embodiment, the through hole 24b of the cover 24 is formed radially inside of the part where the outer centering spring 19 is disposed, and the claw 14c of the outer ring member 14 is provided at the part corresponding to the through hole 24b of the cover 24.

As a result, unlike in the known art, it is not necessary to extend the claw 14c of the outer ring member 14 radially outside to the outer periphery of the cover 24, and thus a weight of the outer ring member 14 can be easily reduced. Further, it is not necessary to avoid a crimping part (the claw 25a fitted in the cutout recess 24a) on the outer periphery of the cover 24. Therefore, the arrangement of the through hole 24b is not restricted, flexibility in layout of the angle regulating part 32 can be improved, and an allowable rotation angle of the operation lever 43 is not limited.

The locked part is not limited to the through hole 24b, and may be a non-through hole (mere depression).

The present invention is not limited to the above embodiment, but can be implemented in various embodiments within the scope of the present invention. The scope of the present invention is set forth by the scope of claims, and includes a meaning equivalent to the scope of claims and any modification within the scope of claims.

The invention claimed is:

1. A clutch unit comprising:
   an input-side clutch section configured to control transmission and interruption of rotational torque input by a rotation of an operation lever; and
   an output-side clutch section configured to transmit the rotational torque from the input-side clutch section to an output side and interrupt rotational torque that is reversely input from the output side, wherein
   the input-side clutch section includes a side plate to which the operation lever is fixed and an outer ring member that fits with and is fixed to the side plate, the output-side clutch section includes a stationary member whose rotation is restricted, and an angle regulating part configured to regulate a rotation angle of the operation lever is disposed radially inside of outer peripheral edges of the outer ring member and the stationary member.

2. The clutch unit according to claim 1, wherein the angle regulating part includes a claw provided on the outer ring member and a locked part provided on the stationary member, the locked part accommodating the claw so as to be movable in a circumferential direction, and locking the claw at a moving end of the claw.

3. The clutch unit according to claim 1, wherein the input-side clutch section and the output-side clutch section are incorporated in an automobile seat lifter.

4. The clutch unit according to claim 2, wherein the input-side clutch section and the output-side clutch section are incorporated in an automobile seat lifter.

* * * * *